United States Patent
Kamenz et al.

(10) Patent No.: US 9,712,405 B2
(45) Date of Patent: Jul. 18, 2017

(54) INTEGRATED REPORTING FOR ON-DEMAND AND ON-PREMISE SOLUTIONS

(71) Applicant: SAP SE, Walldorf (DE)

(72) Inventors: Torsten Kamenz, Wiesloch (DE); Andreas Kemmler, Bonnigheim (DE)

(73) Assignee: SAP SE, Walldorf (DE)

(*) Notice: Subject to any disclaimer, the term of this patent is extended or adjusted under 35 U.S.C. 154(b) by 167 days.

(21) Appl. No.: 14/674,359

(22) Filed: Mar. 31, 2015

(65) Prior Publication Data

US 2016/0294652 A1 Oct. 6, 2016

(51) Int. Cl.
*G06F 11/30* (2006.01)
*H04L 12/26* (2006.01)
*H04L 12/24* (2006.01)

(52) U.S. Cl.
CPC ............ *H04L 43/06* (2013.01); *H04L 41/085* (2013.01); *H04L 41/5051* (2013.01); *H04L 41/145* (2013.01); *H04L 41/22* (2013.01)

(58) Field of Classification Search
CPC ... H04L 41/0853; H04L 41/085; H04L 43/06; H04L 43/065; H04L 41/145; H04L 41/5051; H04L 41/22

USPC .......................................... 709/220–222, 224
See application file for complete search history.

(56) References Cited

U.S. PATENT DOCUMENTS

| | | | |
|---|---|---|---|
| 8,694,559 B2 | 4/2014 | Kemmler et al. | |
| 9,305,034 B2* | 4/2016 | Kemmler | .......... G06F 17/30292 |
| 2015/0112894 A1* | 4/2015 | Lingappa | .......... G06F 17/30522 706/11 |
| 2015/0120785 A1 | 4/2015 | Kemmler et al. | |

* cited by examiner

*Primary Examiner* — Kenneth R Coulter
(74) *Attorney, Agent, or Firm* — Jones Day (57) ABSTRACT

Methods and systems provide integrated reporting for analytics. A flexible solution may be provided via an integrated delivered reporting model for various deployment scenarios. A customer landscape can vary, e.g., including an on-premise product, an on-demand product, or a combination thereof. The products may originate from more than one vendor. A report may be generated based on a virtual data model (VDM) and be compatible with a variety of scenarios and views for cross-reporting. A report may be generated for various deployment scenarios. A report may be generated for data stored in a relational storage apparatus (e.g., a database) with data structure(s) reflected in a corresponding VDM. Methods and systems provide automatic deployment of VDM parts into different storage apparatus/schema and automatic set up of relevant mapping, e.g., schema mapping.

20 Claims, 7 Drawing Sheets

FIG. 11
1100 ically (ERP) systems and software distributed via compact disc, USB drive, etc. are some examples of on-premise products. An on-demand product is a product offered as a service via the Internet. The software may be centrally located in a server farm, a cloud, or elsewhere in the Internet. On-demand products are also known as "software as a service" or "cloud computing." Typically, an on-demand product does not require local installation and operates on a software licensing and delivery model, based on which customers may pay a fee for access or rental of the product. Modern computing systems (i.e., customer landscapes) are becoming increasingly heterogeneous, including a combination of on-premise products and on-demand products.

INTEGRATED REPORTING FOR ON-DEMAND AND ON-PREMISE SOLUTIONS

BACKGROUND

Technology product providers may provide a variety of solutions in different forms. These solutions may include on-premise products and on-demand products. An on-premise product (also known to as "on-premises" or "on-prem") is a product that is typically installed and runs on computers on the premises of the product user, rather than at a remote facility such as at a server farm or a cloud. Traditional enterprise resource planning (ERP) systems and software distributed via compact disc, USB drive, etc. are some examples of on-premise products. An on-demand product is a product offered as a service via the Internet. The software may be centrally located in a server farm, a cloud, or elsewhere in the Internet. On-demand products are also known as "software as a service" or "cloud computing." Typically, an on-demand product does not require local installation and operates on a software licensing and delivery model, based on which customers may pay a fee for access or rental of the product. Modern computing systems (i.e., customer landscapes) are becoming increasingly heterogeneous, including a combination of on-premise products and on-demand products.

Business processes supported by a computing system may be monitored by requesting a report regarding constituent components of the computing system. For instance, a user may request a report regarding human resources aspects, supply chain operations, etc. Needs and interests may vary from user to user. For example, a corporate executive may request reports of highly confidential material. Operational users may request reports with specific line items. Marketing users may request reports with sales statistics.

A common reporting strategy is especially helpful for scenarios or processes that run across different types of solutions. The different solutions may be varied, for example, among other things, being deployed on-premise or on-demand, running on different storage apparatus (also referred to as "database"), and using different data structures. However, the diversity of product types makes it difficult to devise a common, standard reporting solution. Typically, cross-reporting is implemented in a customer-specific project using a data warehouse into which the data from the different solutions are replicated and consolidated. This is difficult and/or time-consuming to implement, and causes performance and consistency issues, and data redundancy. Moreover, reporting frameworks are not easily translatable from one software application to another software application, and existing methods for generating a report for an on-premise product are not compatible with on-demand products due to implementation difference between different types of products. Thus, there exists a need to integrate reporting for both on-premise and on-demand software in today's increasingly heterogeneous computing landscape.

DETAILED DESCRIPTION

Product vendors may provide a variety of on-premise and on-demand solutions. The products may be deployed in various landscape options. In an example customer landscape, on-premise and on-demand products (also referred to as "solutions") may be used in combination. For instance, data of different products may be stored in separate databases or in a same database. Data may be stored according to a single database schema or according to separate database schema. On-premise and on-demand solutions may be used in parallel, integrated with each other, integrated with third-party solutions, etc.

The inventors perceived a need to integrate reporting for on-premise and on-demand software, and developed methods and systems to provide reporting applicable to a product that is on-demand, on-premise, or a combination thereof. This type of reporting is referred to as "integrated reporting" (also "common reporting"). Integrated reporting includes a common reporting scheme across different products, and does not require implementation of specific reporting models for particular user (also referred to as "customer") specifications. That is, reporting may be adaptable to customer demands and/or needs.

Methods and systems of the present disclosure provide reporting that is compatible with a variety of deployment scenarios (also referred to as "deployment configurations") and supports customer set-up of reporting for a variety of landscapes. Embodiments of the present disclosure use at least one virtual data model (VDM) to create an integrated report. Depending on a storage apparatus option in the customer's solution landscape, a delivered VDM may be deployed in different ways to fit into the landscape. Deployment may be carried out automatically after in response to a specification by a user of which products to use and/or where corresponding data are stored. In a specific user situation, a VDM may be automatically deployed into a customer landscape based on the products to be used in cross-reporting. A user (also referred to as "customer") may define which products to use and where the products are deployed. For instance, a user may define whether a product is on-premise, on-demand, and/or to which database the product corresponds, etc. A user may define this information using a tool. Customer information may be evaluated and the VDM may be deployed correspondingly. By way of non-limiting example, the VDM may be delivered via an application such as real-time operational reporting software like SAP HANA® Live, SAP® S/4 HANA, and the like. At runtime, analytical requests may be routed to relevant database server(s) automatically without requiring further configuration. If an existing deployment configuration causes performance or other issues in a cross-reporting scenario, the deployment configuration may be adapted. For example, a tool can provide specific information about issues in a current deployment and make proposals for improvements. A variety of landscape options for the on-premise and on-demand products may be modeled by a combination of basic storage apparatus options. Each of the basic storage apparatus are described herein. One of ordinary skill in the art would understand the concepts described for the basic storage apparatus may be extended to more complex landscape options.

Figure 1:
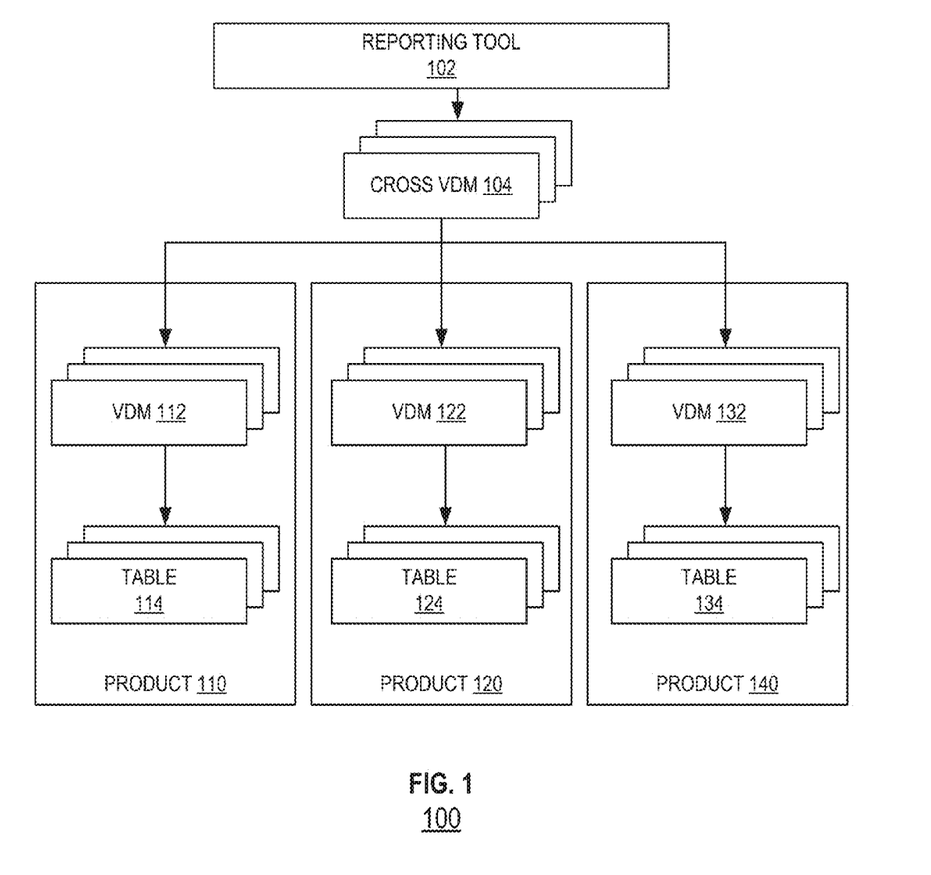
FIG. 1 is a simplified block diagram of a reporting system.

FIG. 1 is a simplified block diagram of a reporting system 100. The reporting system 100 may include a reporting tool 102, products 110, 120, and 140, and a cross VDM 104. The exemplary reporting system 100 is illustrated with three products 110, 120, 140. However, fewer or more products are possible.

The reporting system 100 may include a reporting tool 102. The reporting tool 102 may include a user interface for creating and/or interacting with reports. The reporting tool 102 may include a graphical user interface. The report may be configurable. For example, a reporting format may be defined by a user. As another example, a user may define information for inclusion in a report. The information may include types and/or categories of data for inclusion in a report. For example, a corporate executive may request reports of confidential material. Operational users may request reports with specific line items. Marketing users may request reports including sales statistics. The reporting tool 102 may access a VDM corresponding to each table of a product to access data for the corresponding product, as described herein.

The reporting system 100 may include at least one product 110, 120, 140. Each of the products 110, 120, 140 may represent a computer product. Products may be on-premise, on-demand, or a combination thereof. Each product may include at least one table and at least one VDM. For example, product 100 may include at least one table 114 and at least one VDM 112. A table may include a collection of related data held in a structured format within a storage apparatus. Data in a table may be physically stored in a storage apparatus such as a database. A table may include or represent a relation. Some tables may be of complex structure, and may require technical expertise of table syntax to understand the data contained in the tables. A view may extract data from a table and present the information in a relatively easy-to-consume way. A view may read data from underlying tables, may be a result set of a stored query on data, and/or may be a relational table, with constituent data calculated at query time. A view may represent a subset of data contained in a table such as an aggregation of data, e.g., joining and/or simplifying multiple tables. A view may be queried in a manner similar to how a persistent database collection object such as a table is queried. Changes applied to data in an underlying table may be reflected in data shown in subsequent invocations of the corresponding view. Thus, a view may hide a complexity of data, and allow a better understanding of the tables and makes the data contained in the tables more accessible. A VDM, such as VDM 112 shown in FIG. 1, may include a set of views. A VDM provides a flexible, open, and easy-to-understand report based on existing data structures of a software product by facilitating access to and interpretation of content of a storage apparatus. A VDM may correspond to a specific product or be compatible across products, as discussed herein. For instance, VDM 112 may correspond to an underlying table 114.

The reporting system 100 may include a cross VDM 104. Cross VDM 104 may be used for reporting across different VDMs. That is, reporting cross VDM 104 may be used for reporting across products 110, 120, and 140. The cross VDM 104 may include at least one view. A VDM may correspond to a specific product or be compatible across products. A VDM may include a portion specific to a product ("specific part") and a cross-product portion for compatibility across products ("cross-product part"). A specific part may be used for product-specific reporting, and may be deployed on a storage apparatus of a specific product, regardless of whether the product is deployed on-premise or on-demand. The cross-product part may integrate and/or combine different parts. This may facilitate analytic evaluations via standard reporting tools. Specific VDMs may be implemented for different products and respective data structures. A cross VDM may be implemented for reporting across the different VDMs. A cross VDM may be accessed by a reporting tool. The cross-product VDM and/or specific VDMs may be modeled and delivered in a standard solution. In other words, a standard solution may be provided to different customers using substantially a same solution in specific systems of the customers. This advantageously avoids the need to provide different, specific solutions for each customer. Using the example of reporting system 100 shown in FIG. 1, VDMs 112, 122, and 132 may be specific VDMS, and VDM 104 may be a cross VDM.

Figure 2:
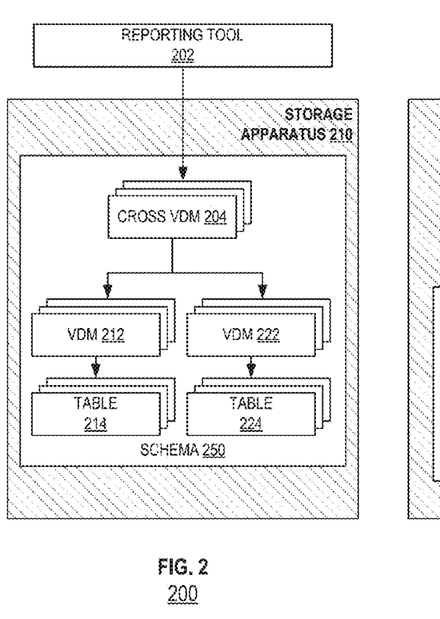
FIG. 2 is a simplified block diagram of a reporting system according to an embodiment.
Figure 3:
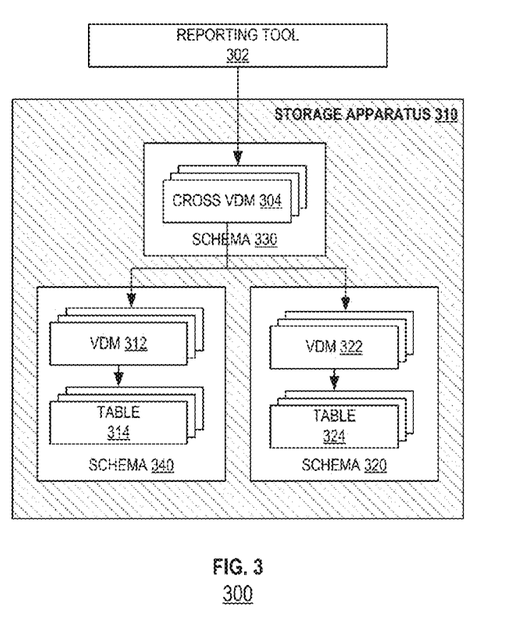
FIG. 3 is a simplified block diagram of a reporting system according to an embodiment.
Figure 4:
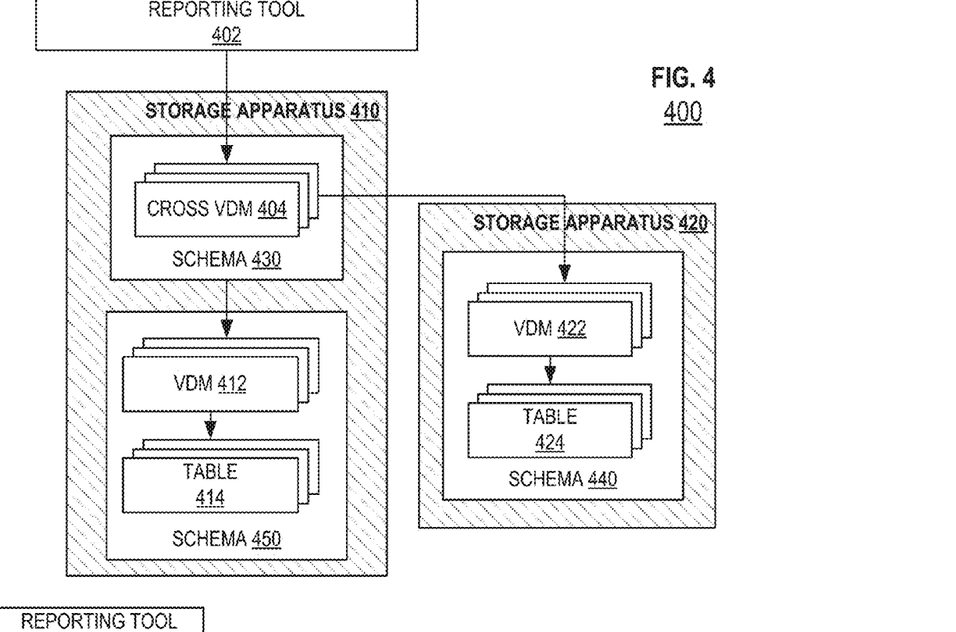
FIG. 4 is a simplified block diagram of a reporting system having more than one storage apparatus according to an embodiment.

Several deployment options are possible. FIGS. 2-4 each illustrates a different type of deployment configuration (also referred to as "deployment option"). These types of deployment configurations may be combined to form other configurations, and may be operated according to the methods described herein.

FIG. 2 is a simplified block diagram of a reporting system 200 according to an embodiment. FIG. 2 may include a reporting tool 202 and a storage apparatus 210. The reporting tool 202 may include a user interface, e.g., a graphical user interface, for creating and/or interacting with reports. The report may be configurable. For example, a reporting format may be defined by a user. As another example, a user may define information for inclusion in a report. The information may include types and/or categories of data for inclusion in a report. The reporting tool 202 may access a VDM corresponding to each table of a product to access data for the corresponding product, as described herein.

The storage apparatus 210 may include a cross VDM 204, at least one VDM 212 corresponding to at least one table 214, and at least one VDM 222 corresponding to at least one table 224. Tables 214, 224 of relevant products may reside in a same schema 250. The VDMs 212, 222 may be deployed into the same schema 250. The mappings of the VDM views may be configured to point to this schema 250. All requests may be made to the schema 250. In an embodiment, the reporting tool 202 may access the storage apparatus 210 by using a commands such as a SELECT statement.

A schema may be a description of a structure of a storage apparatus. For example, the schema may be a description of an organization of data and/or how a storage apparatus is to be constructed. A storage apparatus schema may specify facts that can enter the storage apparatus or those of interest to possible users. For instance, in a relational database, a schema may define tables, fields, relationships, views, indexes, packages, procedures, functions, queues, triggers, types, sequences, materialized views, synonyms, database links, directories, XML schemas, and other elements. A storage apparatus schema may be defined during installation of the software.

FIG. 3 is a simplified block diagram of a reporting system 300 according to an embodiment. In system 300, data of the different products may reside in different schema of a same storage apparatus. For example, the different products may be on-demand products of a same vendor.

The storage apparatus 310 may include a reporting tool 302 and a storage apparatus 310. The reporting tool 302 may include a user interface, e.g., a graphical user interface, for creating and/or interacting with reports. The report may be configurable. For example, a reporting format may be defined by a user. As another example, a user may define information for inclusion in a report. The information may include types and/or categories of data for inclusion in a report. The reporting tool 302 may access a VDM corresponding to each table of a product to access data for the corresponding product, as described herein.

The storage apparatus may include a cross VDM 304, at least one VDM 312, at least one table 314, at least one VDM 322, and at least one table 324. The at least one table 314 may reside in a schema 310. The at least one table 324 may reside in a schema 320. VDM 312 may be deployed into schema 310. VDM 322 may be deployed into the schema 320. The storage apparatus 310 may include schema 310, 320, and 330. Schema 310 may include at least one VDM 312 and at least one underlying table 314. Schema 320 may include at least one VDM 322 and at least one underlying table 324. Schema 310 may be different from schema 320. A specific VDM may be deployed into a particular schema. Cross VDM 304 may be deployed into schema 330, which may be different from schema 310, 320, 330. Alternatively, cross VDM 304 may be deployed into one of the existing specific schema (not shown). The mappings of a VDM view may be adapted to point to a corresponding schema.

FIG. 4 is a simplified block diagram of a reporting system 400 having more than one storage apparatus according to an embodiment. Reporting system 400 is an exemplary deployment configuration for a combination of on-premise and on-demand products or products of different vendors. The reporting system 400 may include a reporting tool 402, a first storage apparatus 410, and a second storage apparatus 420.

The reporting tool 402 may include a user interface, e.g., a graphical user interface, for creating and/or interacting with reports. The report may be configurable. For example, a reporting format may be defined by a user. As another example, a user may define information for inclusion in a report. The information may include types and/or categories of data for inclusion in a report. The reporting tool 402 may access a VDM corresponding to each table of a product to access data for the corresponding product, as described herein.

For example, the reporting system 400 may include a first storage apparatus 410 and a second storage apparatus 420. The data of the products may reside on separate storage apparatuses. For instance, data may reside on separate databases, different data centers, etc. The specific views are deployed into the relevant databases. The cross VDM 404 may be deployed into one of the multiple storage apparatuses (referred to as the "leading storage apparatus"). Access of the cross VDM 404 may be via leading storage apparatus 410. A remote access to the other storage apparatus 420 may be set up automatically. Mappings for the VDM views 422 corresponding to the other storage apparatus 420 may be adapted correspondingly.

Several schema may be provided in the reporting system 400. For example, a schema 430 may correspond to the cross VDM 404. Another schema 410 may correspond to the VDM 412. Another schema 420 may correspond to VDM 422.

Figure 5:
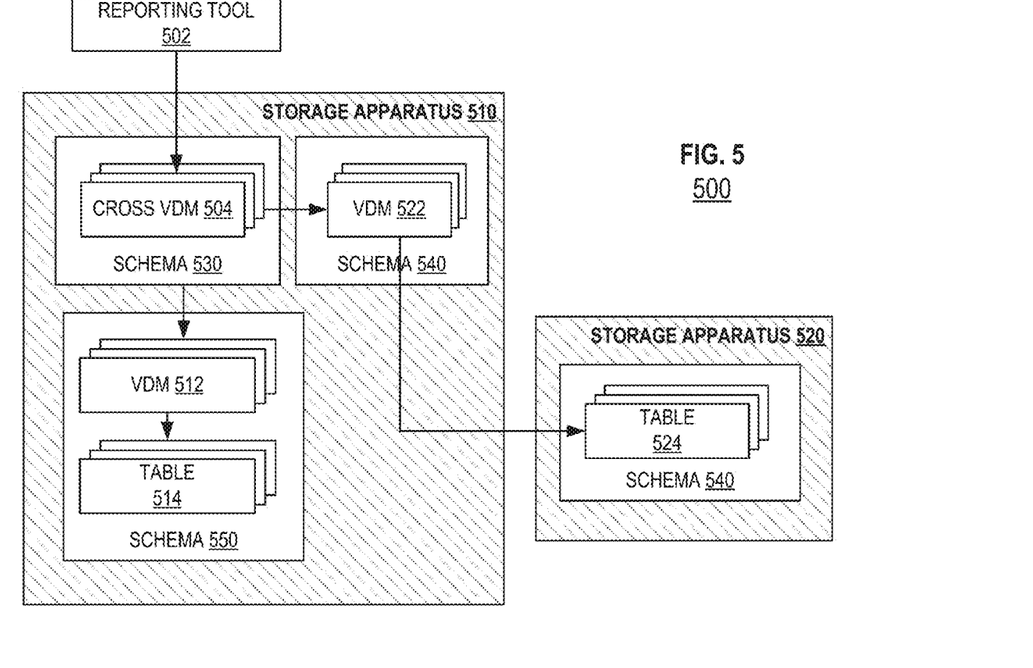
FIG. 5 is a simplified block diagram of a reporting system in which a virtual data model (VDM) is provided in a storage apparatus different from its underlying tables according to an embodiment.

FIG. 5 is a simplified block diagram of a reporting system 500 in which a VDM is provided in a storage apparatus different from its underlying tables according to an embodiment. Reporting system 500 is an exemplary deployment configuration for a combination of on-premise and on-demand products or products of different vendors. The reporting system 500 may include a reporting tool 502, a first storage apparatus 510, and a second storage apparatus 520.

The reporting tool 502 may include a user interface, e.g., a graphical user interface, for creating and/or interacting with reports. The report may be configurable. For example, a reporting format may be defined by a user. As another example, a user may define information for inclusion in a report. The information may include types and/or categories of data for inclusion in a report. The reporting tool 502 may access a VDM corresponding to each table of a product to access data for the corresponding product, as described herein.

For example, the reporting system 500 may include a first storage apparatus 510 and a second storage apparatus 520. The data of the products may reside on separate storage apparatuses. For instance, data may reside on separate databases, different data centers, etc. The specific views are deployed into the relevant databases. The cross VDM 504 may be deployed into one of the multiple storage apparatuses (referred to as the "main storage apparatus"). Access of the cross VDM 504 may be via main storage apparatus 510. A remote access to the other storage apparatus 520 may be set up automatically. Mappings for the VDM views 522 corresponding to the other storage apparatus 520 may be adapted correspondingly.

Several schema may be provided in the reporting system 500. For example, a schema 530 may correspond to the cross VDM 504. Another schema 550 may correspond to the VDM 512. Another schema 540 may correspond to VDM 522. VDM 522 may be in a storage apparatus different from its underlying table 524. VDM 522 may be deployed in storage apparatus 510 and correspond to schema 540. The calls to the table 524 may be remote calls. This deployment scenario may be simpler to set up compared with system 400.

Figure 6:
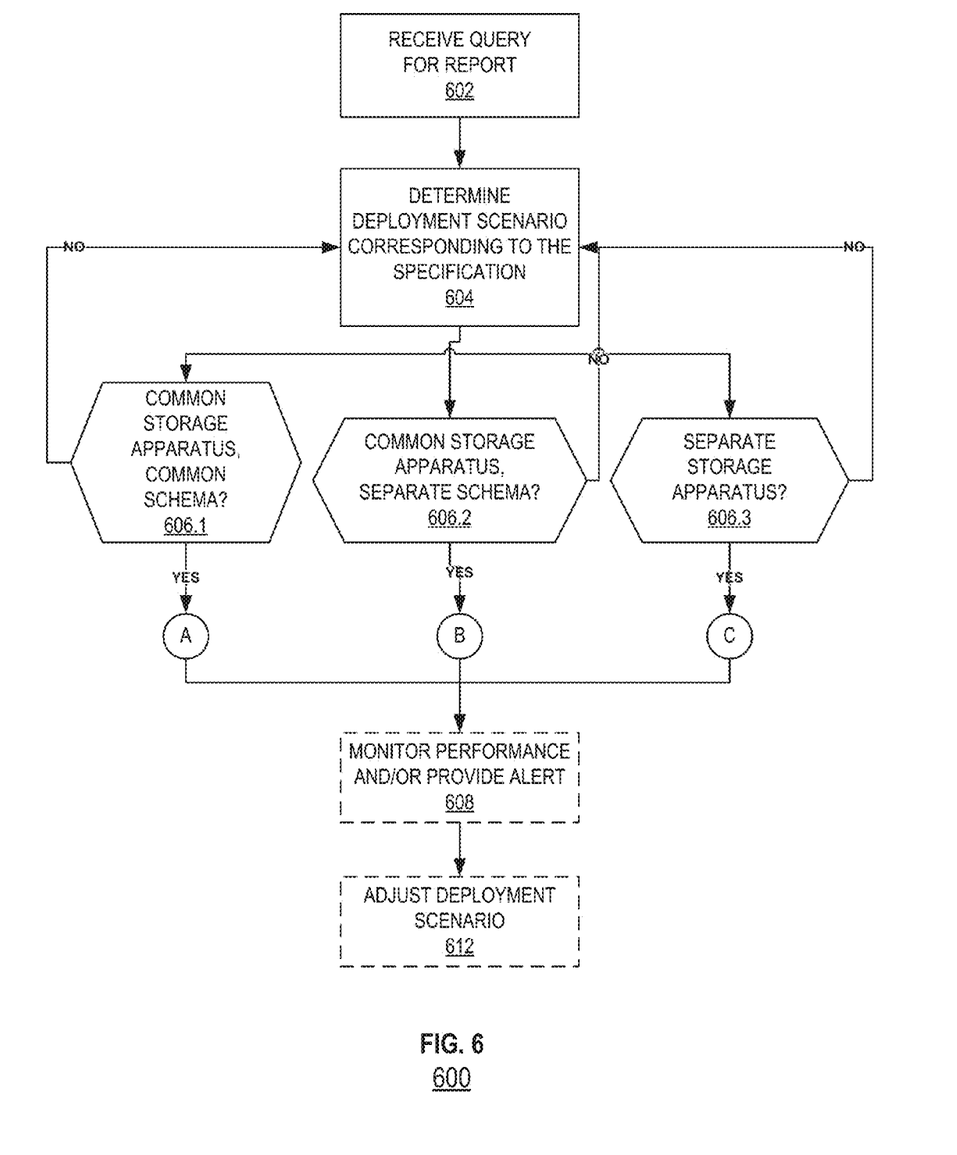
FIG. 6 is a flowchart of a method to report data from a system according to an embodiment.

FIG. 6 is a flowchart of a method 600 to report data from a system according to an embodiment. The method 600 may be operated on a variety of systems, including systems that include an on-premise product, an on-demand product, or a combination thereof In an embodiment, the method 600 is performed by a tool such as reporting tool 202, 302, 402, or 502 shown in FIGS. 2-5.

In 602, the method 600 may receive at least one query for a report. The query may be for information to be included in the report. In an embodiment, the information may include at least one of: product(s) and location(s) of data for which a report is desired. In an embodiment, the information may include at least one of: a product, a storage apparatus, and a schema. The storage apparatus information may include at least one of: a server, a port, and a user authorization/credential. The query and/or information may be provided by a user. For example, the user may define this information in a tool such as reporting tool 202, 302, 402, or 502 shown in FIGS. 2-5. Based on the received information, method 600 may determine at least one deployment scenario that matches the query in 604. The report may be assembled based on the type of deployment scenario, e.g., according to sub-routines A, B, or C as shown in FIG. 6.

Figure 7:
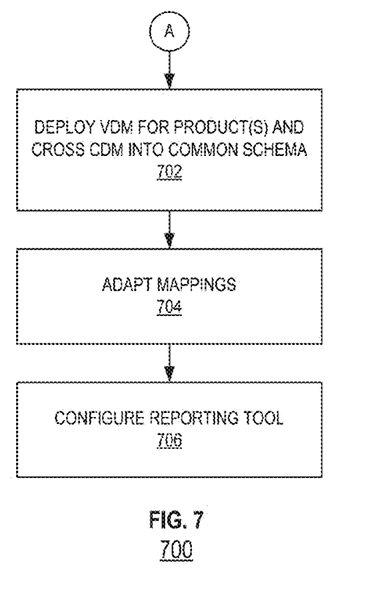
FIG. 7 is a flowchart of a method to report data from a system including a same database and a same schema according to an embodiment.

In 606.1, the method 600 may determine whether the deployment scenario includes a same storage apparatus and a same schema. FIG. 2 illustrates an exemplary deployment scenario including a same storage apparatus 210 and a same schema 250. If the method 600 determines that the deployment scenario includes a same storage apparatus and a same schema, the method may proceed to method 700 (represented by "A") in FIG. 6, as further described herein.

Figure 8:
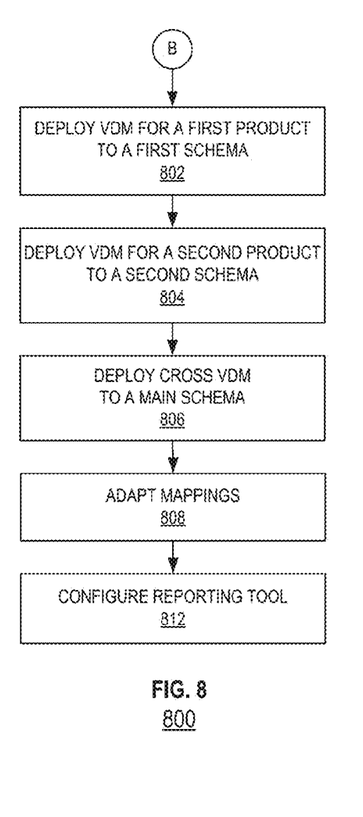
FIG. 8 is a flowchart of a method to report data from a system including a same database and separate schema according to an embodiment.

In 606.2, the method 600 may determine whether the deployment scenario includes a same storage apparatus and separate schema. FIG. 3 illustrates an exemplary deployment scenario including a same storage apparatus 310 and separate schema 320, 340. If the method 600 determines that the deployment scenario includes a same storage apparatus and separate schema, the method may proceed to method 800 (represented by "B") in FIG. 6, as further described herein.

In 606.3, the method 600 may determine whether the deployment scenario includes separate storage apparatus. FIG. 4 illustrates an exemplary deployment scenario including separate storage apparatus 410, 420. If the method 600 determines that the deployment scenario includes separate storage apparatus, the method may proceed to method 900 (represented by "C") in FIG. 6, as further described herein. FIG. 5 illustrates another exemplary deployment scenario including separate storage apparatus 510, 520. If the method 600 determines that the deployment scenario includes separate storage apparatus, the method may proceed to method 950 (represented by "C") in FIG. 6, as further described herein.

In an embodiment, the method 600 may optionally monitor performance of the deployment scenario(s) (608). For example, the method 600 may monitor performance of an analytical evaluation. The method 600 may provide an alert if a situation occurs (608). In an embodiment, a type of situation may be pre-defined and have an associated alert. In an embodiment, a situation may include: slow access due to a data transfer of a size above a threshold ("large data transfer") from a remote storage apparatus to a leading storage apparatus, a runtime exceeding a threshold value ("long runtime"), a delay above a threshold in calling a remote storage apparatus ("long delay"). At least one of the large data transfer, the long runtime, and the long delay may be defined as a "critical situation," and may correspond to a type of alert. An alert for a situation may be provided in visual, audio, or haptic form. For instance, the alert may be presented as a pop-up window in a user interface.

In an embodiment, the method 600 may optionally propose an adjustment to the deployment scenario in 612. The adjustment may be based on the performance monitored in 608. By way of non-limiting example, the adjustment may include replication of at least one table from a remote storage apparatus to a leading database, reconfiguration of VDM deployment, etc. A table selected for replication from the remote storage apparatus to a leading database may be table affecting the performance in a particular way. For example, the effect of a table on performance may be evaluated based on at least one of: processing time, processing power, etc.

In an optional step (not shown) prior to 602, method 600 may assist in development of a system. In an embodiment, the method 600 may author schema for each VDM in a system. For example, the method 600 may provide a specific VDM for each storage apparatus, and a cross VDM for accessing one or more specific VDM.

FIG. 7 is a flowchart of a method 700 to report data from a system including a same database and a same schema according to an embodiment. The method 700 may operate on a system such as the reporting system 200 shown in FIG. 2. The reporting system 200 is shown in a state after performing the steps of method 700. In 702, the method 700 may deploy VDM(s) for each product for which a report is desired, and/or relevant portions of a cross VDM into a common schema. Referring to FIG. 2 and supposing that the method 700 is responding to a request for product(s) associated with tables 214 and 224, the method 700 may deploy VDMs 212 and 222. The method 700 may deploy relevant portions of cross VDM 204 into a common schema 250. Returning to FIG. 7, in 704, the method 700 may adapt mappings of VDM(s) to point to the common schema. Referring to FIG. 2, the method 700 may adapt mappings of VDMs 212, 224 to point to schema 250. Returning to FIG. 7, in 706, the method 700 may configure (or adapt a configuration of) a reporting tool to use the common schema for access to deployment scenario(s). Access may include analytical access of views and/or underlying tables. For instance, access may be by a SELECT statement. Referring to FIG. 2, the method 700 may configure (or adapt a configuration of) reporting tool 202. The reporting tool 202 may then access cross VDM 204 to obtain desired data from VDMs 212, 222 to generate an integrated report.

FIG. 8 is a flowchart of a method 800 to report data from a system including a same database and separate schema according to an embodiment. The method 800 may operate on a system such as reporting system 300 shown in FIG. 3. The reporting system 300 is shown in a state after performing the steps of method 800. In 802, the method 800 may deploy a VDM for a first product to a first schema. In 804, the method 800 may deploy a VDM for a second product to a second schema. The first product and/or second product may be product(s) for which a report is desired. Referring to FIG. 3, and supposing that the method 800 is responding to a request for product(s) associated with tables 314 and 324, the method 800 may deploy a VDM 312 to schema 340. The method 800 may deploy a VDM 322 to schema 320. Returning to FIG. 8, in 806, the method 800 may deploy a cross VDM to a "main" schema (also referred to as a "leading" schema). The "main" schema may be selected by a user or may be automatically selected by method 800. For example, the main schema may be schema 320 or 340 (not shown). Alternatively, the schema may be a schema different from 320, 340 such as schema 330 (shown). Referring to FIG. 3, the method 800 may deploy relevant portions of cross VDM 304 into a common schema 330. Relevant portions may be those portions used to access product(s) corresponding to a query and/or for which a report is desired. Returning to FIG. 8, in 808, the method 800 may adapt mappings of VDM 312 to point to schema 340. The method 800 may adapt mappings of VDM 322 to point to schema 320. Returning to FIG. 8, in 812, the method 800 may configure (or adapt a configuration of) a reporting tool to use the main schema for access to deployment scenario(s).

Access may include analytical access of views and/or underlying tables. For instance, access may be by a SELECT statement. Referring to FIG. 3, the method 800 may configure (or adapt a configuration of) reporting tool 302. The reporting tool 302 may then access cross VDM 304 to obtain desired data from VDMs 312, 322 to generate an integrated report.

Figure 9A:
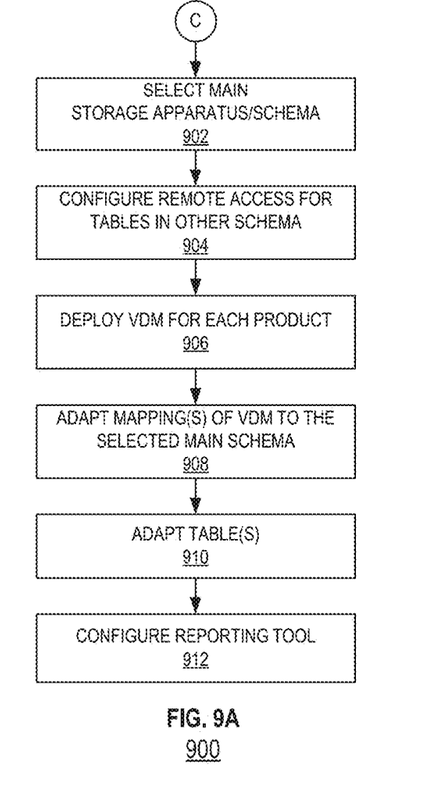
FIG. 9A is a flowchart of a method to report data from a system including separate storage apparatus according to an embodiment.

FIG. 9A is a flowchart of a method 900 to report data from a system including separate storage apparatus according to an embodiment. The method 900 may operate on a system with remote access to table(s). The method 900 may operate on a system such as reporting system 400 shown in FIG. 4. System 400 is shown in a state after performance of method 900. In 902, the method 900 may select a storage apparatus or schema as a "main" storage apparatus or schema. The "main" schema may be selected by a user or may be automatically selected by method 900. For example, the main schema may be schema 440 or 450 (not shown). Alternatively, the schema may be a schema different from 440, 450 such as schema 430 (shown). The following discussion refers to steps performed based on selection of a main schema. The concepts apply equally to steps performed based on a selection of a main storage apparatus.

Referring to FIG. 4, and supposing that the method 900 is responding to a request for product(s) associated with tables 414 and 424, the method 900 may select storage apparatus 410 as the main storage apparatus. Alternatively, the method 900 may select schema 430 as the main schema. Returning to FIG. 9A, in 904, the method 900 may configure remote access for relevant tables in schema different from the main schema ("other schema"). Referring to FIG. 4, the method 900 may configure remote access for tables 414 and 424, which are in schema different the main schema 430.

Returning to FIG. 9A, in 906, the method 900 may deploy a VDM for each product to the main schema. The method 900 may deploy a VDM for a first product to the main schema. The first product and/or second product may be product(s) for which a report is desired. The method 900 may deploy a VDM for a second product to the main schema (906). The method 900 may deploy a cross VDM to the main schema. Referring to FIG. 4, and supposing that the method 900 is responding to a request for product(s) associated with tables 414 and 424, the method 900 may deploy a VDM 412 to main schema 430. The method 900 may deploy VDM 422 to main schema 430.

Returning to FIG. 9A, in 908, the method 900 may adapt mappings of each VDM to point to the selected main schema. Referring to FIG. 4, the method 900 may adapt mapping of VDMs 412, 422 to point to schema 430. The method 900 may adapt mappings of VDM 422 to point to schema 430. Returning to FIG. 9A, in 910, the method 900 may adapt table calls in a VDM different from a main VDM to use remote access to the main schema. Referring to FIG. 4, method 900 may adapt table calls for table 424 to use remote access to main schema 430. Method 900 may adapt table calls for table 414 to use remote access to main schema 430.

Returning to FIG. 9A, in 912, the method 900 may configure (or adapt a configuration of) a reporting tool to use the main schema for access to deployment scenario(s). Access may include analytical access of views and/or underlying tables. For instance, access may be by a SELECT statement. Referring to FIG. 4, the method 900 may configure (or adapt a configuration of) reporting tool 402. The reporting tool 402 may then access cross VDM 404 to obtain desired data from VDMs 412, 422 to generate an integrated report.

Figure 9B:
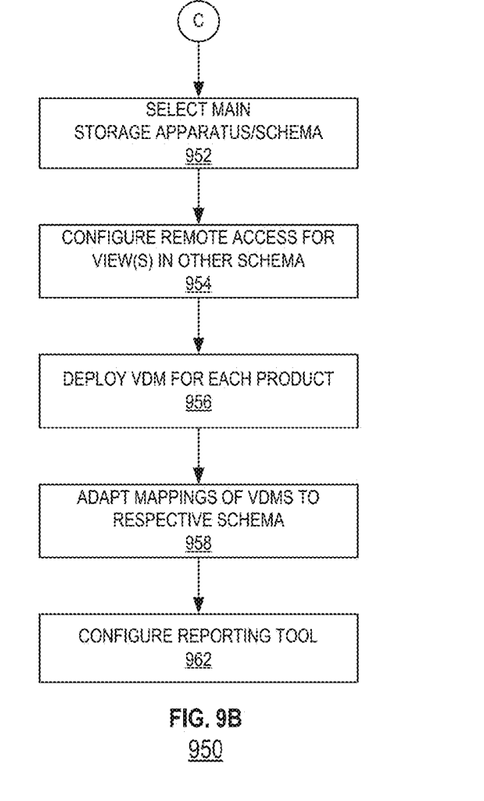
FIG. 9B is a flowchart of a method to report data from a system including separate storage apparatus according to an embodiment.

FIG. 9B is a flowchart of a method 950 to report data from a system including separate storage apparatus according to an embodiment. The method 950 may operate on a system with remote access to view(s). The method 950 may operate on system such as reporting system 500 shown in FIG. 5. System 500 is shown in an initial state, prior to performance of method 950. In 952, the method 950 may select a storage apparatus or schema as a "main" storage apparatus or schema. The "main" schema may be selected by a user or may be automatically selected by method 900. For example, the main schema may be schema 540 or 550 (not shown). Alternatively, the schema may be a schema different from 540, 550 such as schema 530 (shown). Referring to FIG. 5 and supposing that the method 900 is responding to a request for product(s) associated with tables 514 and 524, the method 950 may select storage apparatus 510 as the main storage apparatus. Alternatively, the method 950 may select schema 530 as the main schema. Returning to FIG. 9B, in 954, the method 950 may configure remote access for views in schema other schema, i.e., schema different from the main schema. Referring to FIG. 5, the method 950 may configure remote access for tables 514 and 524, which are in schema different the main schema 530.

Returning to FIG. 9B, in 956, the method 950 may deploy a VDM for a first product to a main schema. The method 950 may deploy a VDM for a second product to a remote schema. The first product and/or second product may be product(s) for which a report is desired. The method 950 may deploy cross VDM to the main schema. Referring to FIG. 5, and supposing that the method 950 is responding to a request for products associated with tables 514 and 524, the method 950 may deploy a VDM 512 to main schema 530. The method 950 may deploy VDM 522 to remote schema 540.

Returning to FIG. 9B, in 958, the method 950 may adapt mappings of each VDM to point a respective schema. Method 950 may adapt mappings of a first VDM to point to a main schema. Method 950 may adapt mappings of a second VDM to point to a remote schema. Method 950 may adapt mappings of a cross VDM to point to the main schema for access to the first VDM and may adapt mappings of the cross VDM to point to the remote schema for access to the second VDM.

Referring to FIG. 5, method 950 may adapt mappings of VDM 512 to point to main schema 530. The method 950 may adapt mappings of VDM 522 to point to remote schema 540. Returning to FIG. 9B, in 960, the method 950 may adapt mappings of a cross VDM to use a first schema for access to a first VDM. The method 950 may adapt mappings of the cross VDM to use remote access to a second schema for a second VDM. Referring to FIG. 5, the method 950 may adapt mappings of cross VDM 504 to use main schema 530 for access to VDM 512. The method 950 may adapt mappings of cross VDM 504 to use remote schema 540 for access to VDM 522.

Returning to FIG. 9B, in 962, the method 950 may configure (or adapt a configuration of) a reporting tool to use the main schema for access to deployment scenario(s). Access may include analytical access of views and/or underlying tables. For instance, access may be by a SELECT statement. Referring to FIG. 5, the method 950 may configure (or adapt a configuration of) reporting tool 502. The reporting tool 502 may then access cross VDM 504 to obtain desired data from VDMs 512, 522 to generate an integrated report.

Whether method 600 proceeds to method 900 or 950 may depend on a deployment scenario. For instance, method 900 may be performed if a cross VDM has remote access to table(s). Method 950 may be performed if a cross VDM has remote access to view(s).

While the description here pertains to on-premise products, on-demand products and relational databases, the concepts described here apply as well to other reporting applications. For example, the concepts apply for any other software product based on a relational database and for a combination of products, which may include third party products.

Figure 10:
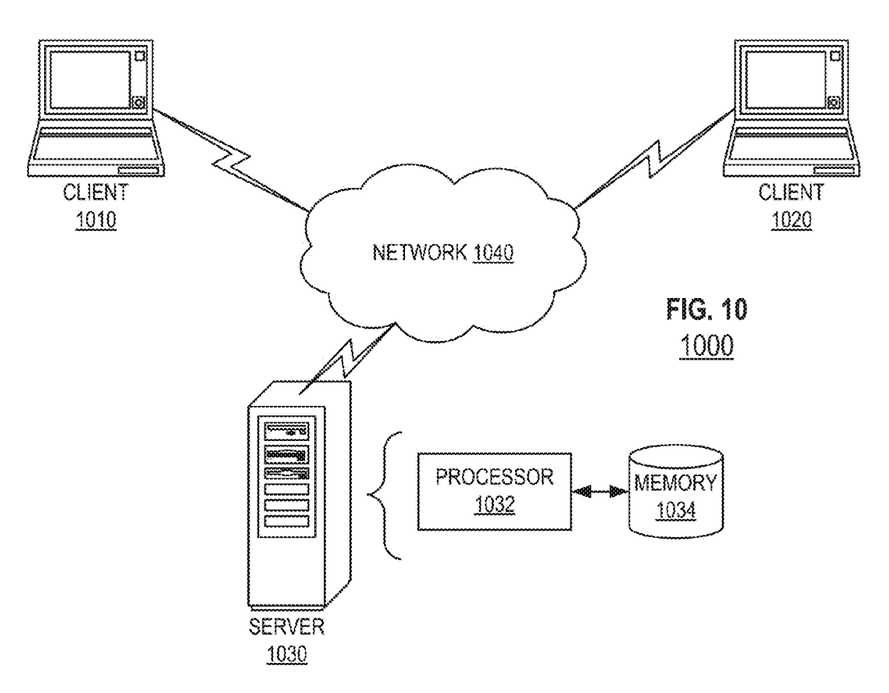
FIG. 10 is a simplified block diagram of a system according to an embodiment.

FIG. 10 is a simplified block diagram of a system 100, which may be used to implement the methods and systems described herein. The system 100 may include a plurality of clients 1010, 1020 and a server 1030 interconnected via network 1040. The server may include a processor 1032 in communication with a computer-readable medium 1034. The computer-readable medium 1034 may be a database internal or external to the processor or external storage means. The computer-readable medium 1034 may include instructions executable by the processor such that when the processor executes various portions of the instructions, the instructions cause the processor to perform the various methods described herein. Each of the clients 1010, 1020 can communicate with the processor 1032 to request applications stored in the server 1030.

Figure 11:
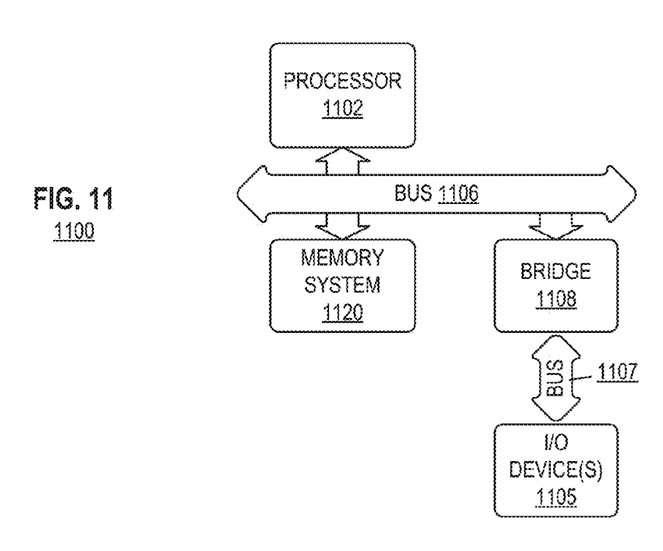
FIG. 11 is a simplified block diagram of a system according to an embodiment.

FIG. 11 is a simplified block diagram of a device 1100 implementing the methods and systems described herein. As shown in FIG. 11, the device 1100 may include a processor 1102, a memory system 1120, and at least one input/output (I/O) device 1105. The processor may be implemented according to the methods and systems described herein. For example, the processor may be configured to perform the steps of methods 600, 700, 800, 900, and/or 950 shown in FIGS. 6, 7, 8, 9A, and 9B.

The processor 1102, memory system 1120, and I/O device(s) 1105 may be communicatively coupled to each other. The communication may be implemented in a variety of ways, e.g., via at least one computer bus 1106 and/or bridge device 1108. The I/O device(s) 1105 may include network adapters and/or mass storage devices from which the device 1100 may receive commands for executing the methods described herein. The I/O device(s) 1105 may be implemented according to the methods and systems described herein. For example, the I/O device(s) may receive input from a user, e.g., a matching command.

Although the foregoing description includes several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

As used in the appended claims, the term "computer-readable medium" may include a single medium or multiple media, such as a centralized or distributed database, and/or associated caches and servers that store one or more sets of instructions. The term shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

The present specification describes components and functions that may be implemented in particular embodiments which may operate in accordance with one or more particular standards and protocols. However, the disclosure is not limited to such standards and protocols. Such standards periodically may be superseded by faster or more efficient equivalents having essentially the same functions. Accordingly, replacement standards and protocols having the same or similar functions are considered equivalents thereof The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

For example, operation of the disclosed embodiments has been described in the context of servers and terminals that implement storage apparatus such as databases. These systems can be embodied in electronic devices or integrated circuits, such as application specific integrated circuits, field programmable gate arrays and/or digital signal processors. Alternatively, they can be embodied in computer programs that execute on personal computers, notebook computers, tablets, smartphones or computer servers. Such computer programs typically are stored in physical storage media such as electronic-, magnetic- and/or optically-based storage devices, where they may be read to a processor, under control of an operating system and executed. And, of course, these components may be provided as hybrid systems that distribute functionality across dedicated hardware components and programmed general-purpose processors, as desired.

In addition, in the foregoing Detailed Description, various features may be grouped or described together the purpose of streamlining the disclosure. This disclosure is not to be interpreted as reflecting an intention that all such features are required to provide an operable embodiment, nor that the claimed embodiments require more features than are expressly recited in each claim. Rather, as the following claims reflect, subject matter may be directed to less than all of the features of any of the disclosed embodiments. Thus, the following claims are incorporated into the Detailed Description, with each claim standing on its own as defining separately claimed subject matter.

Also, where certain claims recite methods, sequence of recitation of a particular method in a claim does not require that that sequence is essential to an operable claim. Rather, particular method elements or steps could be executed in different orders without departing from the scope or spirit of the disclosure.

What is claimed is:

1. A computer-implemented method to generate a report for a system, the system including at least one on-premise product being executed on a local client computing system and at least one on-demand product being executed on a remote computing system, the method comprising:
   receiving, by a processor, a query for the report, the query including at least one product for which the report is to be generated, the processor being a hardware-based computer processor;
   determining, by the processor, a deployment configuration of the system including storage apparatus corresponding to both of the at least one on-premise product and the at least one on-demand product;
   adapting, by the processor, mappings of a virtual data model (VDM) of each of the storage apparatus based on the deployment configuration;
   configuring, by the processor, a reporting tool to use a main schema for access to each of the storage apparatus;
   accessing, by the processor, each of the storage apparatus, based on the configuring; and
   rendering, by the processor, the report for the at least one on-premise product and the at least one on-demand product based on the accessing.

2. The method of claim 1, wherein the determining of the deployment configuration includes:
   determining, by the processor, that the system includes a common storage apparatus and a common schema corresponding to the at least one product for which the report is to be generated; and
   responsive to the determination:
      deploying a VDM for each of the at least one product into a common schema used by each of the least one product; and
      deploying a cross VDM into the common schema;
   wherein the adapting of the mappings includes adapting mappings of the respective VDM for each storage apparatus corresponding to the at least one product to point to the common schema; and
   wherein the main schema used by the reporting tool is the common schema.

3. The method of claim 1, wherein the determining of the deployment configuration includes:
   determining, by the processor, that the system includes:
      (i) a common storage apparatus and
      (ii) a first schema corresponding to a first one of the at least one product, and
      (iii) a second schema corresponding to a second one of the at least one product,
      the first schema being different from the second schema; and
   responsive to the determination:
      deploying a first VDM for the first product into the first schema;
      deploying a second VDM for the second product into the second schema; and
      deploying a cross VDM into the main schema; and
   wherein the adapting of the mappings includes adapting mappings of each VDM to point to a respective schema into which the corresponding VDM is deployed.

4. The method of claim 3, wherein the main schema is at least one of: the first schema and the second schema.

5. The method of claim 1, wherein the determining of the deployment configuration includes:
   determining, by the processor, that the system includes:
      (i) a first storage apparatus corresponding to a first one of the at least one product and
      (ii) a second storage apparatus corresponding to a second one of the at least one product, the first storage apparatus being different from the second storage apparatus;
   responsive to the determination:
      selecting at least one of a main storage apparatus and the main schema;
      configuring remote access for associated tables in each schema different from the selected at least one of the main storage apparatus and the main schema; and
      deploying each VDM into the main schema; and
   subsequent to the adapting of the mappings, adapting table calls to use remote access to schema different from the main schema;
   wherein the adapting of the mappings includes adapting mappings of each VDM to point to the selected main schema.

6. The method of claim 5, wherein the determining of the deployment configuration further includes determining, by the processor that at least one table corresponding to the second product is remote from the selected at least one of the main storage apparatus and the main schema.

7. The method of claim 1, wherein the determining of the deployment configuration includes:
   determining, by the processor, that the system includes:
      (i) a first storage apparatus corresponding to a first one of the at least one product and
      (ii) a second storage apparatus corresponding to a second one of the at least one product,
      the first storage apparatus being different from the second storage apparatus;
   responsive to the determination:
      selecting at least one of a main storage apparatus and the main schema;
      configuring remote access for associated views in each schema different from the selected at least one of the main storage apparatus and the main schema;
      deploying each VDM in the first storage apparatus into the main schema; and
      deploying each VDM in the second storage apparatus into a remote schema; and
   wherein the adapting of the mappings includes:
      adapting mappings of each VDM in the first storage apparatus to point to the main schema;
      adapting mappings of each VDM in the second storage apparatus to point to the remote schema;
      adapting mappings of the cross VDM to use the main schema for access to each VDM in the first storage apparatus and use the remote schema for access to each VDM in the second storage apparatus.

8. The method of claim 7, wherein the determining of the deployment configuration further includes determining, by the processor that at least one view corresponding to the second product is remote from the selected at least one of the main storage apparatus and the main schema.

9. The method of claim 7, further comprising:
determining, by the processor, based on the monitoring, that a performance of the system is below a threshold; and
responsive to the determination of the performance, outputting, by the processor, an alert.

10. The method of claim 1, further comprising:
monitoring, by the processor, the system, including at least one of: a size of a data transfer, a runtime, and a processing delay.

11. The method of claim 10, further comprising:
adjusting, by the processor, the deployment configuration of the system based on the monitored performance.

12. A system to generate a report for a storage apparatus system, the storage apparatus system including at least one on-premise product being executed on a local client computing system and at least one on-demand product being executed on a remote computing system, the system comprising:
at least one storage apparatus to store data associated with each of the at least one on-premise product and the at least one on-demand product;
a processor configured to:
receive a query for the report, the query including at least one product for which the report is to be generated;
determine a deployment configuration of the system including storage apparatus corresponding to both of the at least one on-premise product and the at least one on-demand product;
adapt mappings of a virtual data model (VDM) of each of the storage apparatus based on the deployment configuration;
configure a reporting tool to use a main schema for access to each of the storage apparatus;
access each of the storage apparatus, based on the configuration; and
render the report for the at least one on-premise product and the at least one on-demand product based on the access;
wherein the processor is a hardware-based computer processor.

13. The system of claim 12, wherein the processor is further configured to:
determine that the system includes a common storage apparatus and a common schema corresponding to the at least one product for which the report is to be generated; and
responsive to the determination:
deploy a VDM for each of the at least one product into a common schema used by each of the least one product; and
deploy a cross VDM into the common schema;
wherein the adapting of the mappings includes adapting mappings of the respective VDM for each storage apparatus corresponding to the at least one product to point to the common schema; and
wherein the main schema used by the reporting tool is the common schema.

14. The system of claim 12, wherein the processor is further configured to:
determine that the system includes:
(i) a common storage apparatus and
(ii) a first schema corresponding to a first one of the at least one product, and
(iii) a second schema corresponding to a second one of the at least one product,
the first schema being different from the second schema; and
responsive to the determination:
deploy a first VDM for the first product into the first schema;
deploy a second VDM for the second product into the second schema; and
deploy a cross VDM into the main schema; and
wherein the adapting of the mappings includes adapting mappings of each VDM to point to a respective schema into which the corresponding VDM is deployed;
wherein the main schema is at least one of: the first schema and the second schema.

15. The system of claim 12, wherein the processor is further configured to:
determine that the system includes:
(i) a first storage apparatus corresponding to a first one of the at least one product and
(ii) a second storage apparatus corresponding to a second one of the at least one product,
the first storage apparatus being different from the second storage apparatus;
responsive to the determination:
select at least one of a main storage apparatus and the main schema;
configure remote access for associated tables in each schema different from the selected at least one of the main storage apparatus and the main schema; and
deploy each VDM into the main schema; and
subsequent to the adapting of the mappings, adapt table calls to use remote access to schema different from the main schema;
wherein the adapting of the mappings includes adapting mappings of each VDM to point to the selected main schema.

16. The system of claim 12, wherein the processor is further configured to:
determine that the system includes:
(i) a first storage apparatus corresponding to a first one of the at least one product and
(ii) a second storage apparatus corresponding to a second one of the at least one product,
the first storage apparatus being different from the second storage apparatus;
responsive to the determination:
select at least one of a main storage apparatus and the main schema;
configure remote access for associated views in each schema different from the selected at least one of the main storage apparatus and the main schema;
deploy each VDM in the first storage apparatus into the main schema; and
deploy each VDM in the second storage apparatus into a remote schema; and
wherein the adapting of the mappings includes:
adapting mappings of each VDM in the first storage apparatus to point to the main schema;
adapting mappings of each VDM in the second storage apparatus to point to the remote schema;
adapting mappings of the cross VDM to use the main schema for access to each VDM in the first storage apparatus and use the remote schema for access to each VDM in the second storage apparatus.

17. A non-transitory computer-readable medium storing program instructions that, when executed, cause a processor to perform operations to generate a report for a system, the system including at least one on-premise product being executed on a local client computing system and at least one on-demand product being executed on a remote computing system, the operations comprising:

receiving, by the processor, a query for the report, the query including at least one product for which the report is to be generated, the processor being a hardware-based computer processor;

determining, by the processor, a deployment configuration of the system including storage apparatus corresponding to both of the at least one on-premise product and the at least one on-demand product;

adapting, by the processor, mappings of a virtual data model (VDM) of each of the storage apparatus based on the deployment configuration;

configuring, by the processor, a reporting tool to use a main schema for access to each of the storage apparatus;

accessing, by the processor, each of the storage apparatus, based on the configuring; and rendering, by the processor, the report for the at least one on-premise product and the at least one on-demand product based on the accessing.

18. The non-transitory computer readable medium of claim 17, wherein the determining of the deployment configuration includes:

determining, by the processor, that the system includes:
(i) a common storage apparatus and
(ii) a first schema corresponding to a first one of the at least one product, and
(iii) a second schema corresponding to a second one of the at least one product,
the first schema being different from the second schema; and
responsive to the determination:
deploying a first VDM for the first product into the first schema;
deploying a second VDM for the second product into the second schema; and
deploying a cross VDM into the main schema; and
wherein the adapting of the mappings includes adapting mappings of each VDM to point to a respective schema into which the corresponding VDM is deployed; and
wherein the main schema is at least one of: the first schema and the second schema.

19. The non-transitory computer readable medium of claim 17, wherein the determining of the deployment configuration includes: determining, by the processor, that the system includes:
(i) a first storage apparatus corresponding to a first one of the at least one product and
(ii) a second storage apparatus corresponding to a second one of the at least one product,
the first storage apparatus being different from the second storage apparatus;
responsive to the determination:
selecting at least one of a main storage apparatus and the main schema;
configuring remote access for associated tables in each schema different from the selected at least one of the main storage apparatus and the main schema; and
deploying each VDM into the main schema; and
subsequent to the adapting of the mappings, adapting table calls to use remote access to schema different from the main schema;
wherein the adapting of the mappings includes adapting mappings of each VDM to point to the selected main schema.

20. The non-transitory computer readable medium of claim 17, wherein the determining of the deployment configuration includes:

determining, by the processor, that the system includes:
(i) a first storage apparatus corresponding to a first one of the at least one product and
(ii) a second storage apparatus corresponding to a second one of the at least one product,
the first storage apparatus being different from the second storage apparatus;
responsive to the determination:
selecting at least one of a main storage apparatus and the main schema;
configuring remote access for associated views in each schema different from the selected at least one of the main storage apparatus and the main schema;
deploying each VDM in the first storage apparatus into the main schema; and
deploying each VDM in the second storage apparatus into a remote schema; and
wherein the adapting of the mappings includes:
adapting mappings of each VDM in the first storage apparatus to point to the main schema;
adapting mappings of each VDM in the second storage apparatus to point to the remote schema; and
adapting mappings of the cross VDM to use the main schema for access to each VDM in the first storage apparatus and use the remote schema for access to each VDM in the second storage apparatus.

* * * * *